United States Patent
Xu et al.

(10) Patent No.: US 11,070,989 B2
(45) Date of Patent: Jul. 20, 2021

(54) NETWORK SLICE MANAGEMENT METHOD, MANAGEMENT UNIT, AND SYSTEM

(71) Applicant: Huawei Technologies Co., Ltd., Shenzhen (CN)

(72) Inventors: Ruiyue Xu, Shanghai (CN); Yan Li, Shanghai (CN); Kai Zhang, Shanghai (CN); Jun Wang, Shanghai (CN); Li Ji, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/522,131

(22) Filed: Jul. 25, 2019

(65) Prior Publication Data
US 2019/0349792 A1    Nov. 14, 2019

Related U.S. Application Data

(63) Continuation of application No. PCT/CN2017/072666, filed on Jan. 25, 2017.

(51) Int. Cl.
*H04W 24/02* (2009.01)
*H04W 24/10* (2009.01)

(52) U.S. Cl.
CPC ............ *H04W 24/02* (2013.01); *H04W 24/10* (2013.01)

(58) Field of Classification Search
CPC .............................. H04W 24/02; H04W 24/10
(Continued)

(56) References Cited

U.S. PATENT DOCUMENTS 9,363,141 B1   6/2016  Buckley et al.
2011/0317703 A1  12/2011  Dunbar et al.
(Continued)

FOREIGN PATENT DOCUMENTS

CN    101777999 A    7/2010
CN    102971992 A    3/2013
(Continued)

OTHER PUBLICATIONS

"3rd Generation Partnership Project; Technical Specification Group Services and System Aspects; Telecommunication management; Study on management and orchestration of network slicing for next generation network (Release 14)," 3GPP TR 28.801 V0.3.0, S5-166455, XP051205839, pp. 1-24, 3rd Generation Partnership Project, Valbonne, France (2016).
(Continued)

*Primary Examiner* — Faisal Choudhury
(74) *Attorney, Agent, or Firm* — Leydig, Voit & Mayer, Ltd.

(57) ABSTRACT

A network slice management method, and a management unit and a system that are based on the method are provided. The method includes: determining, by a first management unit, subnet requirement information based on network slice requirement information, where a network slice includes at least one subnet; sending, by the first management unit, a first negotiation request to a second management unit, where the first negotiation request carries the subnet requirement information, and the first negotiation request is used to query for a support status of the second management unit for the subnet requirement information; and determining, by the second management unit, that the second management unit can support the subnet requirement information, or determining, by the second management unit, that the second
(Continued)

management unit cannot support the subnet requirement information.

12 Claims, 9 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2016/0335030 | A1 | 11/2016 | Baptist et al. |
| 2017/0093624 | A1* | 3/2017 | Thondapu ........... H04L 61/2015 |
| 2018/0152526 | A1 | 5/2018 | Xie et al. |
| 2019/0386878 | A1* | 12/2019 | Chou ...................... H04W 4/50 |
| 2019/0387411 | A1* | 12/2019 | Choi ...................... H04W 16/10 |
| 2020/0252322 | A1* | 8/2020 | Houyou ................ H04L 47/785 |

FOREIGN PATENT DOCUMENTS

| | | |
|---|---|---|
| CN | 104105094 A | 10/2014 |
| CN | 105813195 A | 7/2016 |
| CN | 106304035 A | 1/2017 |
| WO | 2004003751 A1 | 1/2004 |

OTHER PUBLICATIONS

"Add potential solution for creation of network slice instance," 3GPP TSG SA WG5 (Telecom Management) Meeting #111, Porto (Portugal), S5-171353, XP051218344, pp. 1-2, 3rd Generation Partnership Project, Valbonne, France, (Jan. 16-20, 2017).

"3rd Generation Partnership Project; Technical Specification Group Services and System Aspects; Feasibility Study on New Services and Markets Technology Enablers; Stage 1 (Release 14)," 3GPP TR 22.891 V14.2.0, pp. 1-95, 3rd Generation Partnership Project, Valbonne, France (Sep. 2016).

* cited by examiner

NETWORK SLICE MANAGEMENT METHOD, MANAGEMENT UNIT, AND SYSTEM

CROSS-REFERENCE TO RELATED APPLICATIONS

This application is a continuation of International Application No. PCT/CN2017/072666, filed on Jan. 25, 2017, the disclosure of which is hereby incorporated by reference in its entirety.

TECHNICAL FIELD

Embodiments of the present disclosure relate to the field of communications technologies, and in particular, to a network slice (NSL) management method, a management unit, and a system.

BACKGROUND

During research into a future mobile communications system, a concept of network slicing is introduced. An NSL may be understood as an on-demand network. A physical network may be logically divided into a plurality of NSLs, and different NSLs may be used to carry different services. For example, an electric power company needs to provide a smart meter service, and the service may be implemented by an NSL that connects a series of machine-to-machine (M2M) devices.

In an existing NSL management process, a network management system (NMS) usually selects a plurality of available network function (NF) instances based on NSL requirement information, and sends information and corresponding configuration parameters of different NF instances to different element management systems (EMS) for deployment and configuration. However, in an inter-vendor scenario, an NMS and an EMS may be provided by different vendors, or different EMSs may be provided by different vendors. A vendor cannot obtain information about another vendor. Consequently, an NSL cannot be effectively managed in the inter-vendor scenario.

SUMMARY

Embodiments of the present disclosure provide an NSL management method, a management unit, and a system, to resolve a problem that an NSL cannot be effectively managed in an inter-vendor scenario.

According to an aspect, an embodiment of the present disclosure provides an NSL management method. The method includes: determining, by a first management unit, subnet requirement information based on NSL requirement information, where an NSL includes at least one subnet; sending, by the first management unit, a first negotiation request to a second management unit, where the first negotiation request carries the subnet requirement information, and the first negotiation request is used to query for a support status of the second management unit for the subnet requirement information; and correspondingly, determining, by the second management unit, that the second management unit can support the subnet requirement information, or determining, by the second management unit, that the second management unit cannot support the subnet requirement information.

In the solution in this embodiment of the present disclosure, in an NSL management process, after determining the subnet requirement information, the first management unit can send the first negotiation request to the second management unit, to query for the support status of the second management unit for the subnet requirement information; and correspondingly, the second management unit can determine whether the second management unit can support the subnet requirement information. Therefore, in the solution in this embodiment of the present disclosure, different management units can negotiate with each other for subnet requirement information, so that an NSL is managed more flexibly and effectively in an inter-vendor scenario.

In a possible design, before the first management unit determines the subnet requirement information based on the NSL requirement information, the first management unit may further receive a notification from the second management unit, where the notification is used to instruct the first management unit to determine the subnet requirement information; or the first management unit may further receive an NSL request from a third management unit, where the NSL request carries the NSL requirement information, and the NSL request is used to request creation or modification of the NSL.

In a possible implementation, before sending the notification to the first management unit, the second management unit may further collect subnet network performance. In this case, when the subnet network performance cannot meet the subnet requirement information supported by the second management unit, the second management unit may send the notification to the first management unit.

In a possible design, before the first management unit determines the subnet requirement information based on the NSL requirement information, the first management unit may further receive subnet capability information supported by the second management unit from the second management unit. In this case, the first management unit may determine the subnet requirement information based on the NSL requirement information and the subnet capability information.

In a possible implementation, before receiving the subnet capability information supported by the second management unit from the second management unit, the first management unit may further send a query request to the second management unit, where the query request is used to request the subnet capability information.

In a possible design, the first management unit may determine the subnet requirement information based on the NSL requirement information in the following manner: The first management unit derives requirement information of at least one subnet from the NSL requirement information.

In a possible design, after sending the first negotiation request to the second management unit, the first management unit may further receive a negotiation response from the second management unit, where the negotiation response carries indication information, the indication information is used to indicate the support status of the second management unit for the subnet requirement information, and the support status is that the second management unit can support the subnet requirement information, or the support status is that the second management unit cannot support the subnet requirement information. To be specific, the indication information is used to indicate that the second management unit can support the subnet requirement information, or the indication information is used to indicate that the second management unit cannot support the subnet requirement information.

In a possible implementation, if the support status is that the second management unit can support the subnet requirement information, after receiving the negotiation response from the second management unit, the first management unit may further send a subnet request to the second management unit, where the subnet request is used to request creation of the subnet or modification of an existing subnet, and the subnet request carries the subnet requirement information. Alternatively, if the support status is that the second management unit cannot support the subnet requirement information, after receiving the negotiation response from the second management unit, the first management unit may further send a second negotiation request to the second management unit, where the second negotiation request carries updated subnet requirement information, and the second negotiation request is used to query for a support status of the second management unit for the updated subnet requirement information.

In a possible implementation, the negotiation response may further carry subnet requirement information suggested by the second management unit. For example, if the support status is that the second management unit cannot support the subnet requirement information, after receiving the negotiation response, the first management unit may determine updated subnet requirement information based on the NSL requirement information and the subnet requirement information suggested by the second management unit.

According to another aspect, an embodiment of the present disclosure provides an NSL management method. The method includes: sending, by a first management unit, a query request to a second management unit, where the query request is used to request subnet capability information supported by the second management unit; sending, by the second management unit, the subnet capability information supported by the second management unit to the first management unit; and determining, by the first management unit, subnet requirement information based on NSL requirement information and the subnet capability information supported by the second management unit, where an NSL includes at least one subnet.

In the solution in this embodiment of the present disclosure, the first management unit can obtain the subnet capability information supported by the second management unit from the second management unit, and determine the subnet requirement information based on the NSL requirement information and the subnet capability information supported by the second management unit. Therefore, in the solution in this embodiment of the present disclosure, before determining the subnet requirement information, the first management unit can first obtain the subnet capability information. This facilitates determining of proper subnet requirement information, thereby improving NSL management efficiency in an inter-vendor scenario.

In a possible design, before the first management unit sends the query request to the second management unit, the first management unit may further receive a notification from the second management unit, where the notification is used to instruct the first management unit to determine the subnet requirement information; or the first management unit may further receive an NSL request from a third management unit, where the NSL request carries the NSL requirement information, and the NSL request is used to request creation or modification of the NSL.

In a possible design, the first management unit may further send a subnet request to the second management unit, where the subnet request carries the subnet requirement information, and the subnet request is used to request creation of the subnet or modification of an existing subnet. Correspondingly, after receiving the subnet request from the first management unit, the second management unit may create the subnet or modify the existing subnet, and send information about the created or modified subnet to the first management unit.

In the solutions of the foregoing two aspects, the first management unit may be a cross-domain manager (CDM) unit, and the second management unit may be a core network (CN) domain manager unit, an access network domain manager unit, or a transport network domain manager (TM-DM) unit.

In the solutions of the foregoing two aspects, the NSL requirement information is mandatory information used to determine an NSL. The subnet requirement information is mandatory information used to determine a subnet. The subnet capability information supported by the second management unit is a subnet characteristic supported by the second management unit.

According to still another aspect, an embodiment of the present disclosure provides a first management unit. The first management unit has functions of implementing behaviors of the first management unit in the foregoing method designs. The functions may be implemented by using hardware, or may be implemented by hardware executing corresponding software. The hardware or the software includes one or more modules corresponding to the functions.

In a possible design, the first management unit includes a processor. The processor is configured to support the first management unit in performing corresponding functions in the foregoing methods. Further, the first management unit may further include a communications interface. The communications interface is configured to support communication between the first management unit and a second management unit, a third management unit, or another unit. Further, the first management unit may further include a memory. The memory is configured to be coupled to the processor, and the memory stores a program instruction and data that are mandatory for the first management unit.

According to yet another aspect, an embodiment of the present disclosure provides a second management unit. The second management unit has functions of implementing behaviors of the second management unit in the foregoing method designs. The functions may be implemented by using hardware, or may be implemented by hardware executing corresponding software. The hardware or the software includes one or more modules corresponding to the functions.

In a possible design, the second management unit includes a processor. The processor is configured to support the second management unit in performing corresponding functions in the foregoing methods. Further, the second management unit may further include a communications interface. The communications interface is configured to support communication between the second management unit and a first management unit or another unit. Further, the second management unit may further include a memory. The memory is configured to be coupled to the processor, and the memory stores a program instruction and data that are mandatory for the second management unit.

According to still yet another aspect, an embodiment of the present disclosure provides a communications system. The system includes the first management unit and the second management unit according to the foregoing aspects, or the system includes the first management unit and the second management unit according to the foregoing aspects and a third management unit.

According to a further aspect, an embodiment of the present disclosure provides a computer readable storage medium. The computer readable storage medium stores an instruction. When the instruction runs on a computer, the computer performs the methods according to the foregoing aspects.

According to a still further aspect, an embodiment of the present disclosure provides a computer program product including an instruction. When the computer program product runs on a computer, the computer performs the methods according to the foregoing aspects.

Compared with the prior art, in the solutions in the embodiments of the present disclosure, in an NSL management process, after determining the subnet requirement information, the first management unit can send the first negotiation request to the second management unit, to query for the support status of the second management unit for the subnet requirement information; and correspondingly, the second management unit can determine whether the second management unit can support the subnet requirement information. Therefore, in the solutions in the embodiments of the present disclosure, different management units can negotiate with each other for subnet requirement information, so that an NSL is managed more flexibly and effectively in an inter-vendor scenario.

DESCRIPTION OF EMBODIMENTS

The following describes the technical solutions in the embodiments of the present disclosure with reference to the accompanying drawings in the embodiments of the present disclosure.

A network architecture and a service scenario that are described in the embodiments of the present disclosure are intended to describe the technical solutions in the embodiments of the present disclosure more clearly, but are not construed as a limitation on the technical solutions provided in the embodiments of the present disclosure. A person of ordinary skill in the art may know that, as the network architecture evolves and a new service scenario emerges, the technical solutions provided in the embodiments of the present disclosure are also applicable to a similar technical problem.

Figure 1:
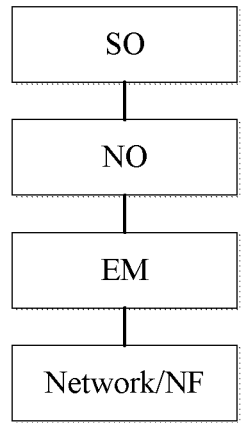
FIG. 1 is a schematic diagram of a possible application scenario according to an embodiment of the present disclosure.
Figure 2:
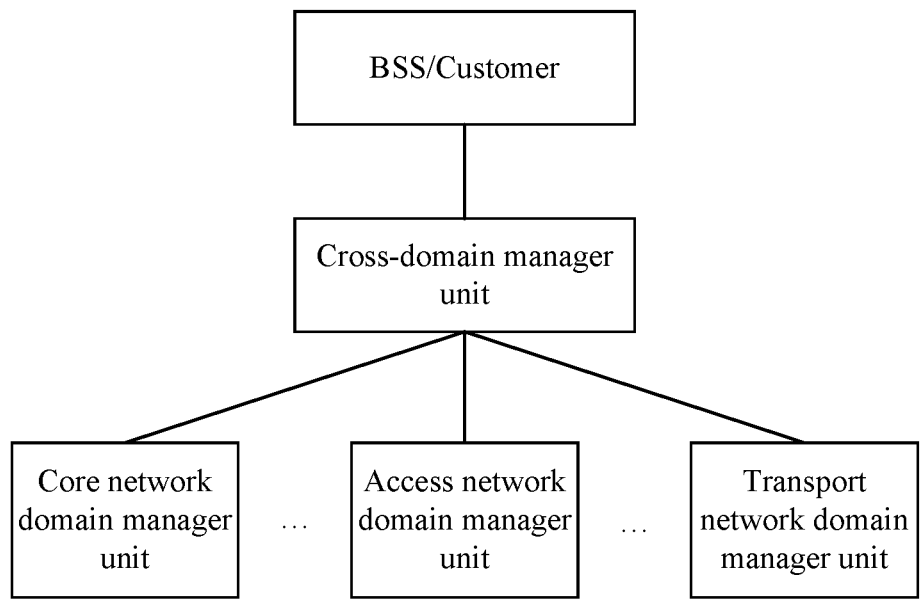
FIG. 2 is a schematic diagram of a possible network architecture according to an embodiment of the present disclosure.

With reference to FIG. 1 and FIG. 2, the following first describes some possible application scenarios and network architectures to which the embodiments of the present disclosure are applicable.

FIG. 1 is a schematic diagram of a possible application scenario according to an embodiment of the present disclosure. The application scenario shown in FIG. 1 includes at least a service orchestrator (SO) unit, a network orchestrator (NO) unit, an element manager (EM) unit, and a network/NF unit. The following briefly describes the units in FIG. 1.

The SO unit may also be referred to as a service orchestration and management unit or a service management unit, and mainly has the following functions: life cycle management (LCM) (for example, instantiation, update, and deletion) of a service based on a service request message, service aggregation, service management such as fault, configuration, accounting, performance, and security (FCAPS) management of a service, mapping between a service and an NSL, and the like. The service may be a communication service that can be shared by a group of users and that satisfies a specified service level agreement (SLA), for example, a mobile broadband (MBB) service, a voice service, or an Internet of Things (IOT) service (for example, an intelligent parking service or a smart meter reading service). For example, the SO unit may manage a service carried by an NSL.

The NO unit may also be referred to as a network orchestration and management unit or a network management unit and mainly has the following functions: NSL management such as NSL LCM and NSL template management; mapping between an NSL and an NF; coordination between different types of network resources; coordination between network resources provided by different operators and different network providers, to ensure that the network resources provided by different network providers can meet requirements of a target service, for example, an SLA requirement, a key performance indicator (KPI) requirement, and a quality of service (QoS) requirement; centralized orchestration of network devices provided by different providers; and providing of an external application programming interface (API). The API is configured to provide an NF for a third party, to implement inter-operator deployment.

The EM unit may also be referred to as an NF manager (NF-M) unit and mainly has the following functions: LCM (for example, instantiation, update, and deletion) of a network element or an NF, FCAPS management of a network element or an NF, and the like.

The network unit may include at least one of a CN unit, an access network unit, or a transport network (TN) unit. It should be noted that the network unit may be replaced with an NF unit, or the network unit may also have a function of an NF unit. The "Network/NF" unit shown in FIG. 1 represents a unit having a function of a network unit and/or a function of an NF unit.

It should be noted that the SO unit or the NO unit may be deployed in an operations support system (OSS), or the SO unit or the NO unit may be deployed independently from an OSS. The OSS may be understood as a device and network maintenance-oriented support system, and is responsible for single-vendor network management and multi-vendor network management.

It may be understood that descriptions of the functions of the foregoing units are merely some example descriptions, and the units may further have other functions. This is not limited in the embodiments of the present disclosure.

For ease of description, a unit may be represented below by its English abbreviation. For example, the SO unit may be represented by SO, and the same is true for the other units. Details are not described again below.

Based on the foregoing application scenario, FIG. 2 shows a possible network architecture according to an embodiment of the present disclosure. As shown in FIG. 2, the network architecture includes a business support system (BSS), a CDM unit, a CN domain manager (CN-DM) unit, a radio access network domain manager (RAN-DM) unit, a TN-DM unit, and the like. The RAN-DM unit may also be referred to as an access network domain manager unit for short. The CDM is connected to the BSS, and the CDM is further separately connected to the CN-DM, the RAN-DM, and the TN-DM.

The following briefly describes the BSS, the CDM, the CN-DM, and the TN-DM separately.

The BSS is responsible for service-related management (for example, service operation, accounting, and customer relationship management) and for providing a service for a terminal. In the network architecture shown in FIG. 2, the BSS may also be replaced with a customer, or the BSS may also have functions of the customer. The functions of the customer include managing a service and providing a corresponding service for the terminal. In FIG. 2, the "BSS/customer" indicates a unit having a function of the BSS and/or a function of the customer.

The CDM may also be referred to as a cross-domain orchestrator unit, and have an NSL management function and/or an NSL orchestration function. For example, the CDM may include some or all of the following functions: NSL management such as NSL LCM, NSL template management, NSL fault management, NSL performance management, and NSL configuration management; mapping between an NSL and a subnet, and mapping between an NSL and an NF; coordination between network resources or SLA information provided by different subdomains (for example, a CN domain, an access network domain, and a TN domain); and unified orchestration of subnet slices and NFs provided by subdomains, where the unified orchestration can make the subnet slices or the NFs provided by the subdomains meet requirements of a target service (for example, an SLA requirement, a KPI requirement, and a QoS requirement).

The NSL may also be referred to as an end-to-end (E2E) NSL. The NSL may include at least a CN part, a radio access network (RAN) part, and a TN part; or the NSL may include any two of a CN part, a RAN part, or a TN part; or the NSL may represent an NSL of a CN part, an NSL of a RAN part, or an NSL of a TN part. It may be understood that the NSL in the embodiments of the present disclosure may have another implementation. This is not limited in the embodiments of the present disclosure.

The CN-DM has a subnet management function on an NSL within a CN domain and/or a subnet orchestration function on an NSL within a CN domain. For example, the CN-DM may include some or all of the following functions: subnet management of the NSL within the CN domain, for example, subnet LCM (including creation, update, deletion, and the like), subnet fault management, subnet performance management, and subnet configuration management; service management within the CN domain, for example, service LCM, service fault management, service performance management, and service configuration management; and coordination between network resources within the CN domain, for unified orchestration.

The RAN-DM has a subnet management function on an NSL within an access network domain and/or a subnet orchestration function on an NSL within an access network domain. For example, the RAN-DM may include some or all of the following functions: subnet management of the NSL within the access network domain, for example, subnet LCM (including creation, update, deletion, and the like), subnet fault management, subnet performance management, and subnet configuration management; service management within the access network domain, for example, service LCM, service fault management, service performance management, and service configuration management; and coordination between network resources within the access network domain, for unified orchestration.

The TN-DM has a subnet management function on an NSL within a TN domain and/or a subnet orchestration function on an NSL within a TN domain. For example, the TN-DM may include some or all of the following functions: subnet management of the NSL within the TN domain, for example, subnet LCM (including creation, update, deletion, and the like), subnet fault management, subnet performance management, and subnet configuration management; service management within the TN domain, for example, service LCM, service fault management, service performance management, and service configuration management; and coordination between network resources within the TN domain, for unified orchestration.

All of the CDM, the CN-DM, the RAN-DM, and the TN-DM may be deployed in an SO or deployed in an NO; or the CDM may be deployed in an NO, and all of the CN-DM, the RAN-DM, and the TN-DM may be deployed in an EM; or the CDM may be deployed in an SO, and all of the CN-DM, the RAN-DM, and the TN-DM may be deployed in an NO.

The following further describes the embodiments of the present disclosure in detail based on common aspects in the foregoing embodiments of the present disclosure.

In an existing NSL management process, an NMS usually selects a plurality of available NF instances based on NSL requirement information, and sends information and corresponding configuration parameters of different NF instances to different EMSs for deployment and configuration. However, in an inter-vendor scenario, an NMS and an EMS may be provided by different vendors, or different EMSs may be provided by different vendors, and a vendor cannot obtain information and a configuration parameter of an NF instance of another vendor. Consequently, an NSL cannot be effectively managed in the inter-vendor scenario.

In view of this, the embodiments of the present disclosure provide an NSL management method, and a management unit and a system that are based on the method. The method includes: determining, by a first management unit, subnet requirement information based on NSL requirement information, where an NSL includes at least one subnet; sending, by the first management unit, a first negotiation request to a second management unit, where the first negotiation request carries the subnet requirement information, and the first negotiation request is used to query for a support status of the second management unit for the subnet requirement information; and correspondingly, determining, by the second management unit, that the second management unit can support the subnet requirement information, or determining, by the second management unit, that the second management unit cannot support the subnet requirement information. In the solution in this embodiment of the present disclosure, in an NSL management process, after determining the subnet requirement information, the first management unit can send the first negotiation request to the second management unit, to query for the support status of the second management unit for the subnet requirement information; and correspondingly, the second management unit can determine whether the second management unit can support the subnet requirement information. Therefore, in the solution in this embodiment of the present disclosure, different management units can negotiate with each other for subnet requirement information, so that an NSL is managed more flexibly and effectively in an inter-vendor scenario.

The NSL requirement information is mandatory information used to determine an NSL. For example, the NSL requirement information may include some or all the following information: an NSL type (for example, enhanced mobile broadband (eMBB), massive machine type communication (mMTC), and ultra-reliable and low latency communications (URLLC)), an SLA requirement of a service or a network KPI of a service, and the like. The SLA requirement of the service or the network KPI of the service may include at least one of the following: a latency, a report success ratio, a delivery success ratio, coverage, a capacity, reliability, or a throughput. The report success ratio may be an uplink packet sending success ratio, the delivery success ratio may be a downlink packet sending success ratio, the coverage may be an area in which a terminal may be located, and the capacity may be a quantity of terminals that can be accommodated.

The subnet requirement information is mandatory information used to determine a subnet. For example, the subnet requirement information may include some or all of the following information: an SLA requirement of a service or a network KPI of a service. The SLA requirement of the service or the network KPI of the service may include at least one of the following: a latency, a report success ratio, a delivery success ratio, coverage, a capacity, reliability, or a throughput.

Figure 3:
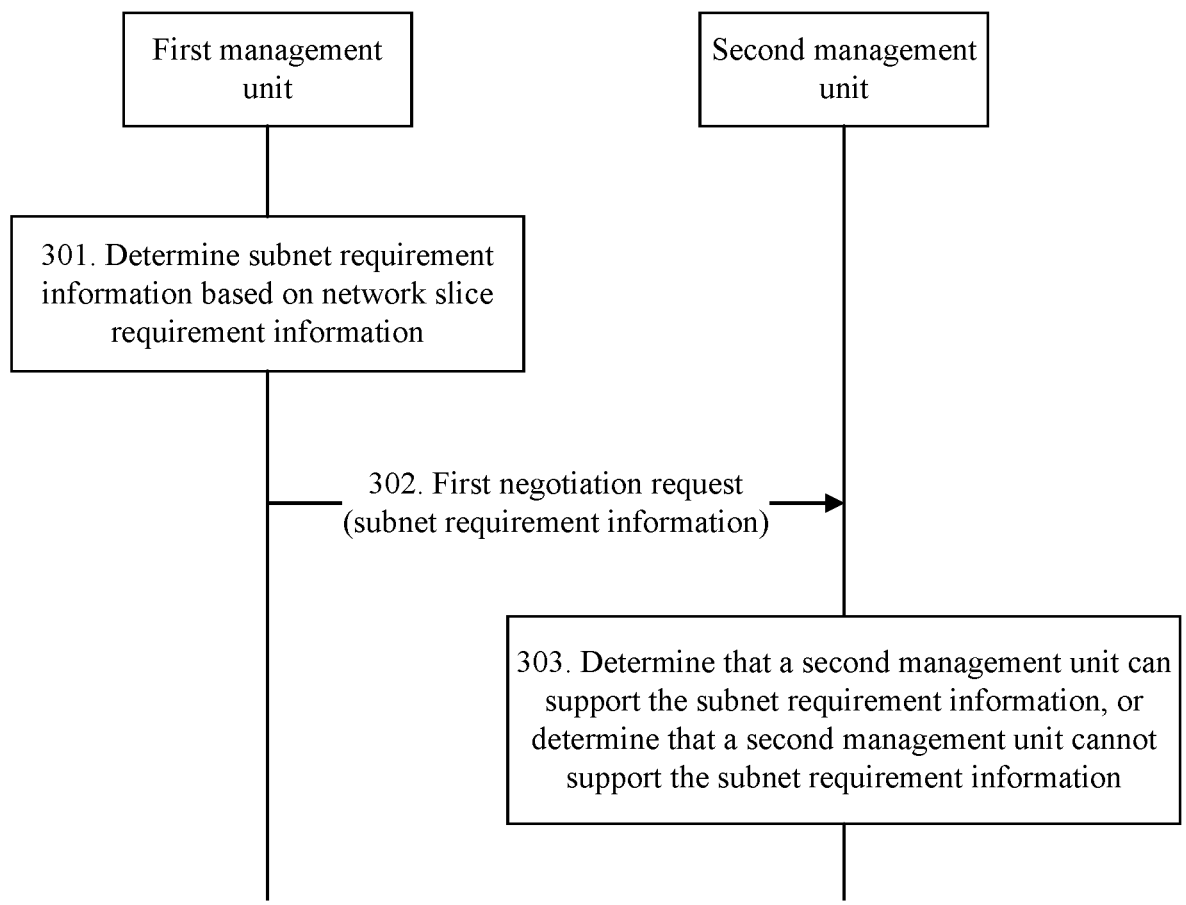
FIG. 3 is a schematic communication diagram of an NSL management method according to an embodiment of the present disclosure.

The following describes a solution provided in the embodiments of the present disclosure with reference to FIG. 3. A method shown in FIG. 3 is described by using the network architecture shown in FIG. 2 as an example. The method shown in FIG. 3 includes part 301 to part 303.

In part 301, a first management unit determines subnet requirement information based on NSL requirement information.

An NSL includes at least one subnet. Optionally, a subnet may also be referred to as a subnetwork.

In an example, before determining the subnet requirement information based on the NSL requirement information, the first management unit may further receive an NSL request from a third management unit, where the NSL request carries the NSL requirement information, and the NSL request is used to request creation or modification of the NSL.

For example, in an initial NSL creation scenario, the third management unit sends the NSL request to the first management unit. The NSL request carries initial NSL requirement information, and the NSL request is used to request creation of the NSL. Correspondingly, the first management unit may determine the subnet requirement information based on the initial NSL requirement information in an NSL creation process. In other words, in the initial NSL creation scenario, the NSL request sent by the third management unit triggers the first management unit to determine the subnet requirement information. The creation of the NSL may also be understood as instantiation of the NSL.

For another example, in an NSL modification scenario, the NSL has been established, and the third management unit may send the NSL request to the first management unit due to change of a received service requirement or the like. The NSL request carries updated NSL requirement information, and the NSL request is used to request modification of the NSL. Correspondingly, the first management unit may determine the subnet requirement information based on the updated NSL requirement information in an NSL modification process. In other words, in the NSL modification scenario, the NSL request sent by the third management unit triggers the first management unit to determine the subnet requirement information. The modification of the NSL may also be understood as update of the NSL.

In another example, before determining the subnet requirement information based on the NSL requirement information, the first management unit may further receive a notification from a second management unit, where the notification is used to instruct the first management unit to determine the subnet requirement information.

In a possible implementation, before sending the notification to the first management unit, the second management unit may further collect subnet network performance. When the subnet network performance cannot meet the subnet requirement information supported by the second management unit, the second management unit may send the notification to the first management unit.

For example, in a scenario in which the second management unit monitors the subnet, the NSL has been established and has run, and the subnet requirement information corresponding to the NSL requirement information is first sub-requirement information. The second management unit may collect the subnet network performance. When the subnet network performance cannot meet the first sub-requirement information, the second management unit may send the notification to the first management unit to instruct the first management unit to adjust the first sub-requirement information, so as to determine second sub-requirement information. The second sub-requirement information is subnet requirement information determined by the first management unit after the notification is received. In other words, in the scenario in which the second management unit monitors the subnet, the notification sent by the second management unit triggers the first management unit to determine the subnet requirement information. In this scenario, the determining the subnet requirement information may be understood as adjusting the subnet requirement information.

In still another example, before the first management unit determines the subnet requirement information based on the NSL requirement information, the first management unit may further receive subnet capability information supported by the second management unit from the second management unit. In this case, the first management unit may determine the subnet requirement information based on the NSL requirement information and the subnet capability information.

In a possible implementation, before receiving the subnet capability information supported by the second management unit from the second management unit, the first management unit may further send a query request to the second management unit, where the query request is used to request the subnet capability information.

The subnet capability information is a subnet characteristic supported by the second management unit. For example, the subnet capability information may include a subnet type, a subnet function, a subnet-supported area, a subnet-supported capacity, a subnet-supported service or network parameter (for example, an SLA), a subnet requirement information range, or the like.

In yet another example, the first management unit may determine the subnet requirement information in the following manner: The first management unit derives requirement information of at least one subnet from the NSL requirement information.

In part 302, the first management unit sends a first negotiation request to a second management unit, where the first negotiation request carries the subnet requirement information.

The first negotiation request is used to query for a support status of the second management unit for the subnet requirement information. For example, the first negotiation request may be used to query whether the second management unit supports the subnet requirement information.

In part 303, the second management unit determines that the second management unit can support the subnet requirement information, or the second management unit determines that the second management unit cannot support the subnet requirement information.

In still yet another example, the second management unit may further send a negotiation response to the first management unit. The negotiation response carries indication information, and the indication information is used to indicate the support status of the second management unit for the subnet requirement information. The support status is that the second management unit can support the subnet requirement information, or the support status is that the second management unit cannot support the subnet requirement information. The negotiation response may be referred to as a first negotiation response.

In a possible implementation, if the support status is that the second management unit can support the subnet requirement information, that is, if the indication information is used to indicate that the second management unit can support the subnet requirement information, after receiving the first negotiation response from the second management unit, the first management unit may further send a subnet request to the second management unit. the subnet request is used to request creation of the subnet or modification of an existing subnet, and the subnet request carries the subnet requirement information.

In another possible implementation, if the support status is that the second management unit cannot support the subnet requirement information, in other words, if the indication information is used to indicate that the second management unit cannot support the subnet requirement information, after receiving the first negotiation response from the second management unit, the first management unit may further update the subnet requirement information, and send a second negotiation request to the second management unit. The second negotiation request carries updated subnet requirement information, and the second negotiation request is used to query for a support status of the second management unit for the updated subnet requirement information.

Correspondingly, after receiving the second negotiation request from the first management unit, the second management unit may further determine whether the second management unit can support the updated subnet requirement information, and may further send a second negotiation response to the first management unit. A specific implementation process is similar to part 303. For details, refer to the descriptions of part 303.

In a further example, the first negotiation response may further carry subnet requirement information suggested by the second management unit. For example, if the second management unit determines that the second management unit cannot support the subnet requirement information, in addition to adding the indication information to the first negotiation response, the second management unit may further add the subnet requirement information suggested by the second management unit. In this way, when updating the subnet requirement information, the first management unit may consider the subnet requirement information suggested by the second management unit. This helps the first management unit and the second management unit to agree on the subnet requirement information.

It should be noted that the first management unit may negotiate with the second management unit for subnet requirement information by continuously sending negotiation requests and negotiation responses, until the second management unit can support subnet requirement information sent by the first management unit.

In the solution shown in FIG. 3, the first management unit may be a CDM unit, the second management unit may be a CN-DM unit, an access network domain manager unit, or a TN-DM unit, and the third management unit may be a BSS/customer.

Figure 4:
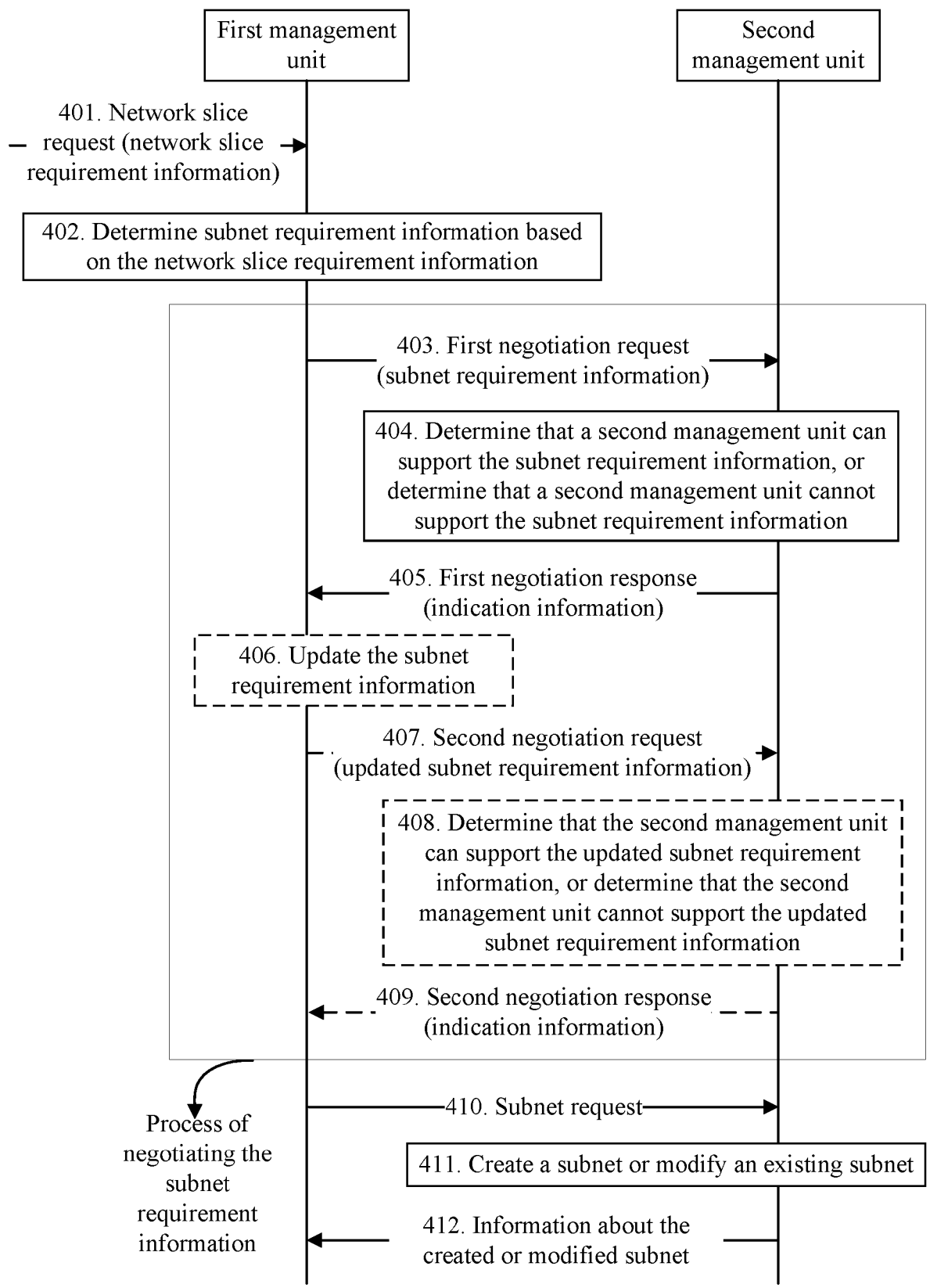
FIG. 4 is a schematic communication diagram of another NSL management method according to an embodiment of the present disclosure.
Figure 5:
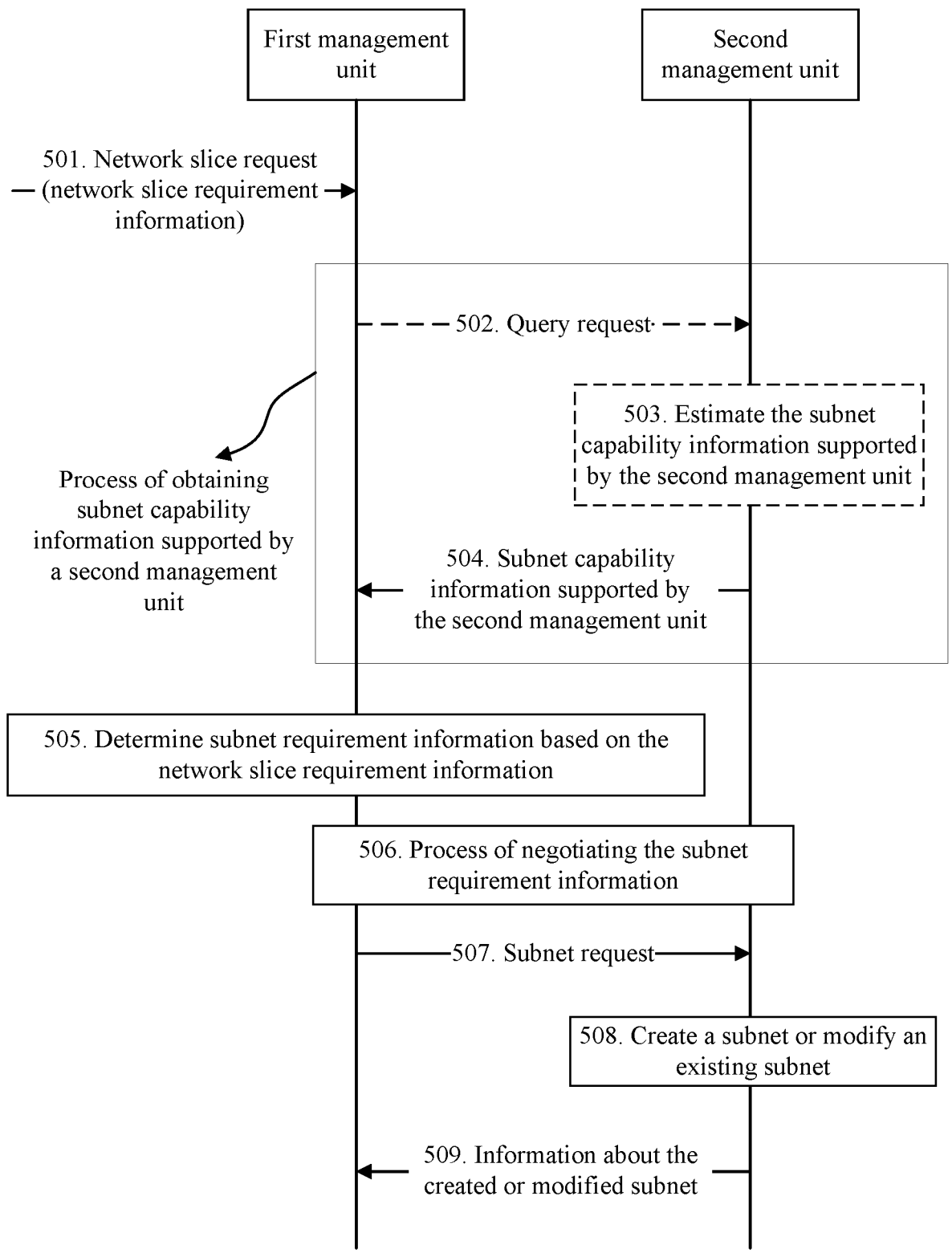
FIG. 5 is a schematic communication diagram of still another NSL management method according to an embodiment of the present disclosure.
Figure 6:
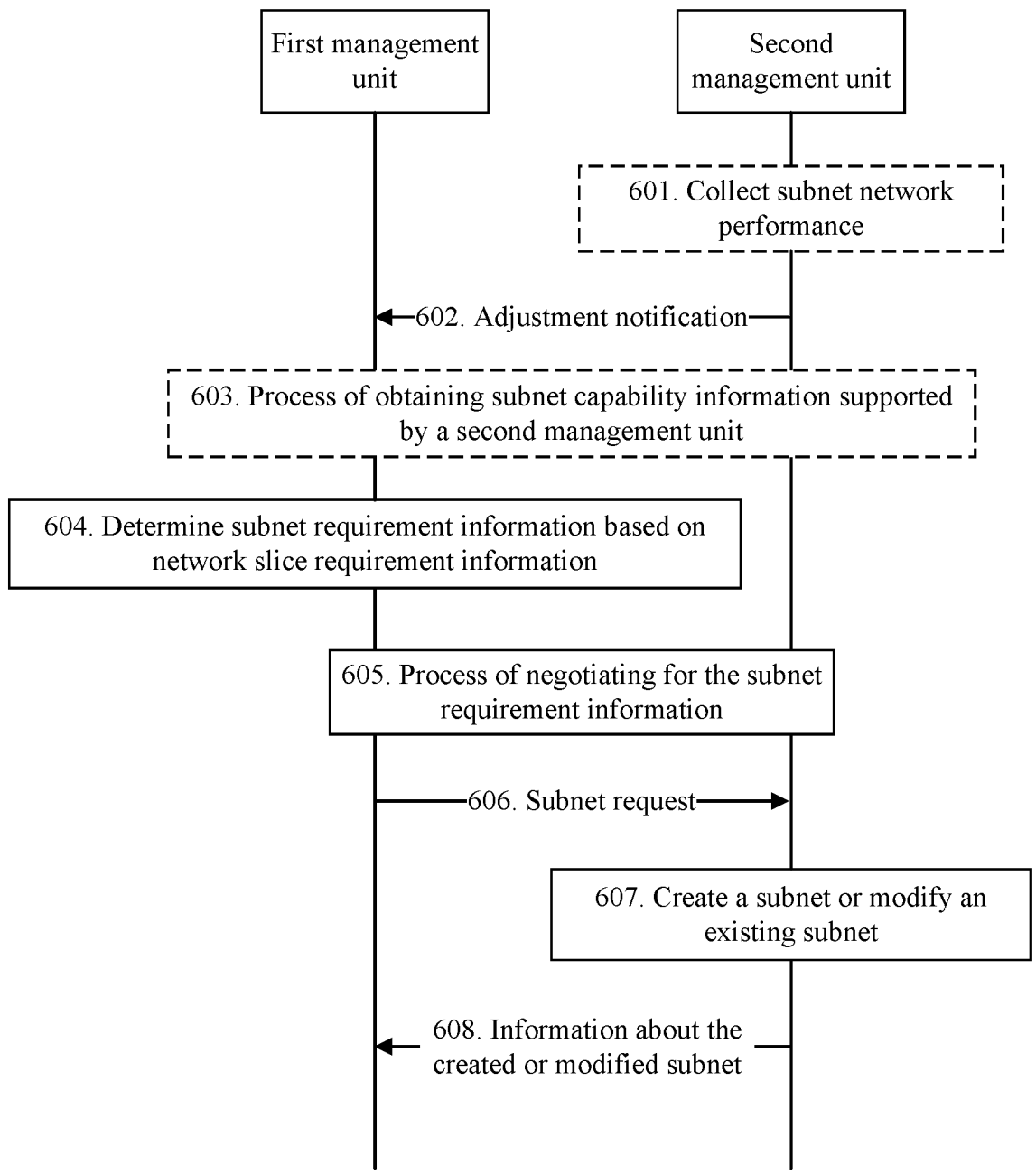
FIG. 6 is a schematic communication diagram of yet another NSL management method according to an embodiment of the present disclosure.

The following further describes, based on the method shown in FIG. 3 and with reference to FIG. 4 to FIG. 6, solutions provided in the embodiments of the present disclosure. For same or similar content between methods shown in FIG. 4 to FIG. 6 and the method shown in FIG. 3, refer to detailed descriptions in FIG. 3. Details are not described herein again. In the methods shown in FIG. 4 to FIG. 6, for descriptions of NSL requirement information, subnet requirement information, and capability information supported by a second management unit, refer to the foregoing detailed descriptions. Details are not described herein again.

FIG. 4 shows an NSL management method in an NSL creation or modification scenario according to an embodiment of the present disclosure. The method shown in FIG. 4 includes part 401 to part 412. Part 406 to part 409 are optional parts.

In part 401, a first management unit receives an NSL request, where the NSL request carries NSL requirement information.

The NSL request is used to request creation or modification of an NSL. In an NSL creation scenario, the NSL requirement information may be initial NSL requirement information. In an NSL modification scenario, the NSL requirement information may be updated NSL requirement information.

In part 402, the first management unit determines subnet requirement information based on the NSL requirement information.

In an example, the first management unit may derives requirement information of at least one subnet from the NSL requirement information. It may be understood that the NSL may include one, two, or more subnets. This is not limited in this embodiment of the present disclosure. For example, if the NSL includes a CN domain subnet, the first management unit may derives requirement information of the CN domain subnet from the NSL requirement information. Certainly, if the NSL includes an access network domain subnet or a TN domain subnet, the first management unit may alternatively derives requirement information of the corresponding domain subnet from the NSL requirement information. For another example, if the NSL includes a CN domain subnet, an access network domain subnet, and a TN domain subnet, the first management unit may derives requirement information of the CN domain subnet, requirement information of the access network domain subnet, and requirement information of the TN domain subnet from the NSL requirement information.

In part 403, the first management unit sends a first negotiation request to a second management unit, where the first negotiation request carries the subnet requirement information, and the first negotiation request is used to query for a support status of the second management unit for the subnet requirement information.

For example, the subnet requirement information is the requirement information of the CN domain subnet, and the second management unit is a CN-DM unit. The first management unit may send the requirement information of the CN domain subnet to the CN-DM by using the first negotiation request, to query for a support status of the CN-DM unit for the requirement information of the CN domain subnet. Certainly, if the subnet requirement information is the requirement information of the access network domain subnet, and the second management unit is an access network domain manager unit, or if the subnet requirement information is the requirement information of the TN domain subnet, and the second management unit is a TN-DM unit, the first management unit may alternatively send the requirement information of the corresponding domain subnet to the second management unit.

For another example, if the first management unit derives requirement information of at least one subnet from the NSL requirement information into the requirement information of the CN domain subnet, the requirement information of the access network domain subnet, and the requirement information of the TN domain subnet in part 402, the first management unit may alternatively send the requirement information of the corresponding domain subnets to a CN-DM unit, an access network domain manager unit, and a TN-DM unit, respectively. In this case, the first management unit negotiates with different second management units for the requirement information of the corresponding domain subnets, respectively.

In part 404, the second management unit determines that the second management unit can support the subnet requirement information, or the second management unit determines that the second management unit cannot support the subnet requirement information.

In part 405, the second management unit sends a first negotiation response to the first management unit, where the first negotiation response carries indication information.

For example, if the second management unit determines, in part 404, that the second management unit can support the subnet requirement information, the indication information is used to indicate that the second management unit can support the subnet requirement information. In this case, the indication information may be understood as a positive indication. Alternatively, if the second management unit determines, in part 404, that the second management unit cannot support the subnet requirement information, the indication information is used to indicate that the second management unit cannot support the subnet requirement information. In this case, the indication information may be understood as a negative indication.

In an example, if the indication information is a negative indication, the first negotiation response may further carry subnet requirement information suggested by the second management unit.

If the second management unit sends a positive indication to the first management unit in part 405, go to part 410. If the second management unit sends the negative indication to the first management unit in part 405, go to part 406.

In part 406, the first management unit updates the subnet requirement information.

For example, the first management unit may update the subnet requirement information based on the NSL requirement information and the subnet requirement information suggested by the second management unit.

In part 407, the first management unit sends a second negotiation request to the second management unit, where the second negotiation request carries updated subnet requirement information, and the second negotiation request is used to query for a support status of the second management unit for the updated subnet requirement information.

In part 408, the second management unit determines that the second management unit can support the updated subnet requirement information, or the second management unit determines that the second management unit cannot support the updated subnet requirement information.

In part 409, the second management unit sends a second negotiation response to the first management unit, where the second negotiation response carries indication information.

For example, if the second management unit determines, in part 408, that the second management unit can support the updated subnet requirement information, the indication information is a positive indication; if the second management unit determines, in part 408, that the second management unit cannot support the updated subnet requirement information, the indication information is a negative indication.

If the second management unit sends the positive indication to the first management unit in part 409, go to part 410. If the second management unit sends the negative indication to the first management unit in part 409, part 406 to part 409 are performed repeatedly until the second management unit sends the positive indication to the first management unit; and then, part 410 is performed.

In part 410, the first management unit sends a subnet request to the second management unit, where the subnet request is used to request creation of a subnet or modification of an existing subnet.

The subnet request carries the subnet requirement information. It should be noted that the subnet requirement information is subnet requirement information on which the first management unit and the second management unit agree after negotiation. For example, if the second management unit sends the positive indication to the first management unit in part 405, the subnet requirement information is the subnet requirement information determined by the first management unit in part 402. For another example, if the second management unit sends the negative indication to the first management unit in part 405, the subnet requirement information is the updated subnet requirement information obtained by the first management unit in part 406. It may be understood that in the latter case, after part 406 to part 409 are performed only one time, the first management unit may receive, in part 409, the positive indication sent by the second management unit; or after part 406 to part 409 are performed at least two times, the first management unit may receive, in part 409 that is performed for the last time, the positive indication sent by the second management unit. For all the cases, the updated subnet requirement information is subnet requirement information obtained by performing last update by the first management unit before part 410.

In part 411, the second management unit creates the subnet or modifies the existing subnet.

For example, in a case in which there is no existing subnet, the second management unit may create the subnet based on the subnet requirement information carried in the subnet request. For another example, the second management unit may reuse the existing subnet, and the second management unit may modify the existing subnet in a reuse process, so as to meet the subnet requirement information carried in the subnet request.

In part 412, the second management unit sends information about the created or modified subnet to the first management unit.

It should be noted that part 403 to part 409 in the method shown in FIG. 4 may be referred to as a subnet requirement information negotiation process. It may be understood that in the negotiation process, the first management unit may need to negotiate with the second management unit once, twice, or more times to agree on the subnet requirement information.

FIG. 5 shows another NSL management method in an NSL creation or modification scenario according to an embodiment of the present disclosure. The method shown in FIG. 5 includes part 501 to part 509. The part 502 and the part 503 are optional parts.

Part 501, part 505, and part 507 to part 509 in FIG. 5 are the same as or similar to part 401, part 402, and part 410 to part 412 in FIG. 4, respectively. For details, refer to the descriptions of part 401, part 402, and part 410 to part 412. Part 506 is the same as or similar to the subnet requirement information negotiation process in FIG. 4. For details, refer to the descriptions of the subnet requirement information negotiation process in FIG. 4. Details are not described herein again.

A difference between the method shown in FIG. 5 and the method shown in FIG. 4 is as follows: Before the first management unit determines the subnet requirement information based on the NSL requirement information, the method shown in FIG. 5 further includes a process of obtaining subnet capability information supported by a second management unit. Further, the first management unit may determine the subnet requirement information based on the NSL requirement information and the subnet capability information. The obtaining process may include part 504, or may include part 503 and part 504, or may include part 502 to part 504.

In part 502, the first management unit sends a query request to the second management unit, where the query request is used to query for the subnet capability information supported by the second management unit.

In part 503, the second management unit estimates the subnet capability information supported by the second management unit.

In part 504, the second management unit sends the subnet capability information supported by the second management unit to the first management unit. For example, the second management unit may send a query response to the first management unit, where the query response carries the subnet capability information supported by the second management unit.

FIG. 6 shows an NSL management method in a subnet monitoring scenario according to an embodiment of the present disclosure. In the method shown in FIG. 6, an NSL has been established and has run. In this case, subnet requirement information corresponding to NSL requirement information is first sub-requirement information. The method shown in FIG. 6 includes part 601 to part 608, and part 601 and part 603 are optional parts.

In part 601, a second management unit collects subnet network performance.

In part 602, the second management unit sends an adjustment notification to a first management unit, where the adjustment notification is used to instruct the first management unit to adjust the subnet requirement information.

Specifically, the subnet requirement information herein is the first sub-requirement information. When the subnet network performance cannot meet the first sub-requirement information, the second management unit may send the adjustment notification to the first management unit, to instruct the first management unit to adjust the first sub-requirement information.

In part 603, a process of obtaining subnet capability information supported by the second management unit is performed between the first management unit and the second management unit.

Specifically, for details about the obtaining process, refer to descriptions of the process of obtaining subnet capability information supported by a second management unit in the method shown in FIG. 5. Details are not described herein again.

In part 604, the first management unit determines the subnet requirement information based on the NSL requirement information.

Specifically, the subnet requirement information herein is second sub-requirement information. After receiving the adjustment notification, the first management unit may adjust the first sub-requirement information based on the NSL requirement information, to determine the second sub-requirement information. Optionally, when part 603 is performed, the first management unit may determine the second sub-requirement information based on the NSL requirement information and the subnet capability information. In other words, the determining the subnet requirement information in part 604 may be understood as adjusting the subnet requirement information.

Part 605 to part 608 are the same as or similar to part 506 to part 509 in FIG. 5. For details, refer to the descriptions of part 506 to part 509. Details are not described herein again.

Figure 7:
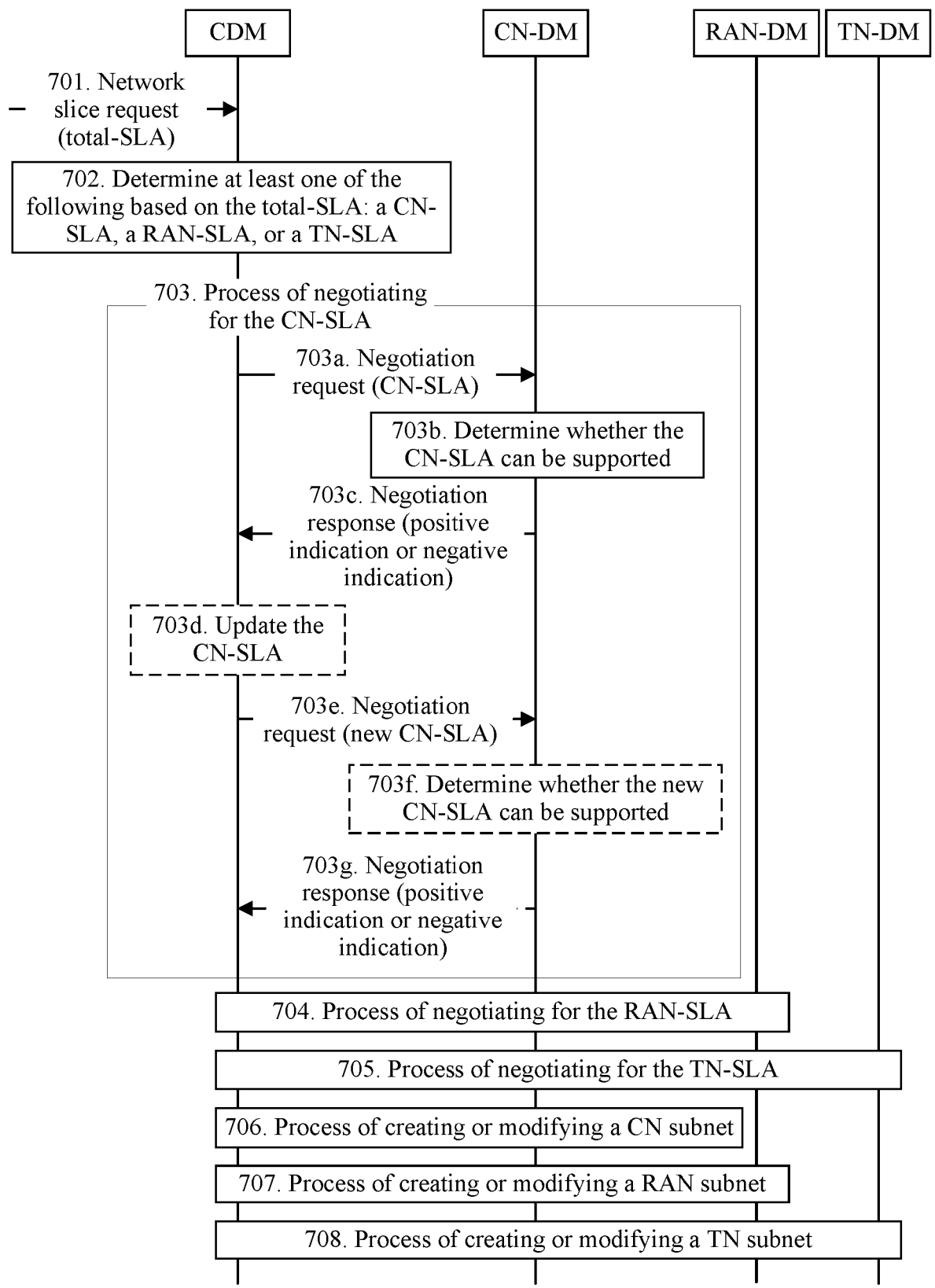
FIG. 7 is a schematic communication diagram of still yet another NSL management method according to an embodiment of the present disclosure.

The following describes, with reference to FIG. 7, a solution according to an embodiment of the present disclosure by using an example in which a first management unit is a CDM, a second management unit is at least one of a CN-DM, a RAN-DM, or a TN-DM, NSL requirement information is an NSL SLA, and subnet requirement information is a subnet SLA in an NSL creation scenario.

The NSL requirement information is described as a total-SLA or an E2E-SLA, requirement information of a CN domain subnet is described as a CN-SLA, requirement information of an access network domain subnet is described as a RAN-SLA, and requirement information of a TN domain subnet is described as a TN-SLA. For example, the following provides description by using an example in which an SLA includes a latency and a report success ratio.

A method shown in FIG. 7 may include part 701 to part 703 and part 706; or may include part 701, part 702, part 704, and part 707; or may include part 701, part 702, part 705, and part 708; or may include part 701 to part 704, part 706, and part 707; or may include part 701 to part 703, part 705, part 706, and part 708; or may include part 701, part 702, part 704, part 705, part 707, and part 708; or may include part 701 to part 708. The following provides description by using an example in which the method shown in FIG. 7 includes part 701 to part 708.

In part 701, a CDM receives an NSL request, where the NSL request carries a total-SLA.

For example, the CDM may receive the NSL request from a BSS/customer.

In an example, the total-SLA includes a total-latency and a total-report success ratio. For ease of description, in the following, the total-report success ratio is represented by a total-ratio, and the same is true for the other content related to a report success ratio. Details are not described again below. For example, total-latency=10 milliseconds (ms), and total-ratio=96%.

In part 702, the CDM determines at least one of the following based on the total-SLA: a CN-SLA, a RAN-SLA, or a TN-SLA.

For example, the CDM may determine the CN-SLA, the RAN-SLA, and the TN-SLA based on the total-SLA.

In an example, in correspondence to the total-SLA in part 701, the CN-SLA includes a CN-latency and a CN-ratio, the RAN-SLA includes a RAN-latency and a RAN-ratio, and the TN-SLA includes a TN-latency and a TN-ratio. For example, CN-latency=3 ms, RAN-latency=2 ms, and TN-latency=5 ms; and CN-ratio×RAN-ratio×TN-ratio=96%.

In part 703, the CDM negotiates with a CN-DM for the CN-SLA.

Part 703 may include part 703a to part 703c. Alternatively, part 703 may include part 703a to part 703g. A specific implementation of part 701a to part 701g is similar to that of part 403 to part 409 in FIG. 4. For details, refer to the descriptions of part 403 to part 409. Details are not described herein again.

Part 704 and part 705 are similar to part 703. For details, refer to an implementation process of part 703. Details are not described herein again.

It should be noted that when an SLA of a network domain subnet or SLAs of at least two network domain subnets need to be updated, the CDM needs to comprehensively consider SLAs of all network domain subnets during update. For example, when the CN-DM cannot support the CN-SLA, a RAN-DM can support the RAN-SLA, and a TN-DM can support the TN-SLA, the CDM needs to determine a new CN-SLA, a new RAN-SLA, and a new TN-SLA, send the new CN-SLA to the CN-DM, send the new RAN-SLA to the RAN-DM, and send the new TN-SLA to the TN-DM. It may be understood that if the new RAN-SLA remains unchanged relative to the RAN-SLA used before updating, the CDM does not need to send the new RAN-SLA to the RAN-DM; or if the new TN-SLA remains unchanged relative to the TN-SLA used before update, the CDM does not need to send the new TN-SLA to the TN-DM.

After part 703 to part 705 are performed, the CDM separately completes a process of negotiation with the CN-DM, the RAN-DM, and the TN-DM.

In part 706, a CN subnet establishment or modification process is performed between the CDM and the CN-DM.

The CDM may send, to the CN-DM in the CN subnet establishment or modification process, the CN-SLA that is agreed on after negotiation. Specifically, for a specific implementation of the establishment or modification process, refer to an implementation process of part 410 to part 412 in FIG. 4. Details are not described herein again.

Part 707 and part 708 are similar to part 706. For details, refer to an implementation process of part 706. Details are not described herein again.

It should be noted that in an NSL modification scenario or a subnet monitoring scenario, the NSL management method provided in the embodiments of the present disclosure may be implemented by using a method similar to the method shown in FIG. 7. Details are not described herein.

To improve NSL management efficiency in an inter-vendor scenario, the embodiments of the present disclosure further provide another NSL management method, and a management unit and a system that are based on the method. The method includes: sending, by a first management unit, a query request to a second management unit, where the query request is used to request subnet capability information supported by the second management unit; sending, by the second management unit, the subnet capability information supported by the second management unit to the first management unit; and determining, by the first management unit, subnet requirement information based on NSL requirement information and the subnet capability information supported by the second management unit, where an NSL includes at least one subnet. For example, the method may be shown in FIG. 8A.

In the method, for content that is the same as or similar to that of the method shown in FIG. 3, refer to the detailed descriptions in FIG. 3. In addition, for descriptions of the NSL requirement information, the subnet requirement information, and the subnet capability information supported by the second management unit, refer to the foregoing detailed descriptions. Details are not described herein again.

In an example, before the first management unit sends the query request to the second management unit, the first management unit may further receive a notification from the second management unit, where the notification is used to instruct the first management unit to determine the subnet requirement information; or the first management unit may further receive an NSL request from a third management unit, where the NSL request carries the NSL requirement information, and the NSL request is used to request creation or modification of the NSL.

In an example, the first management unit may further send a subnet request to the second management unit. The subnet request carries the subnet requirement information, and the subnet request is used to request creation of the subnet or modification of an existing subnet. Correspondingly, after receiving the subnet request, the second management unit may create the subnet or modify the existing subnet, and send information about the created or modified subnet to the first management unit.

Figure 8A:
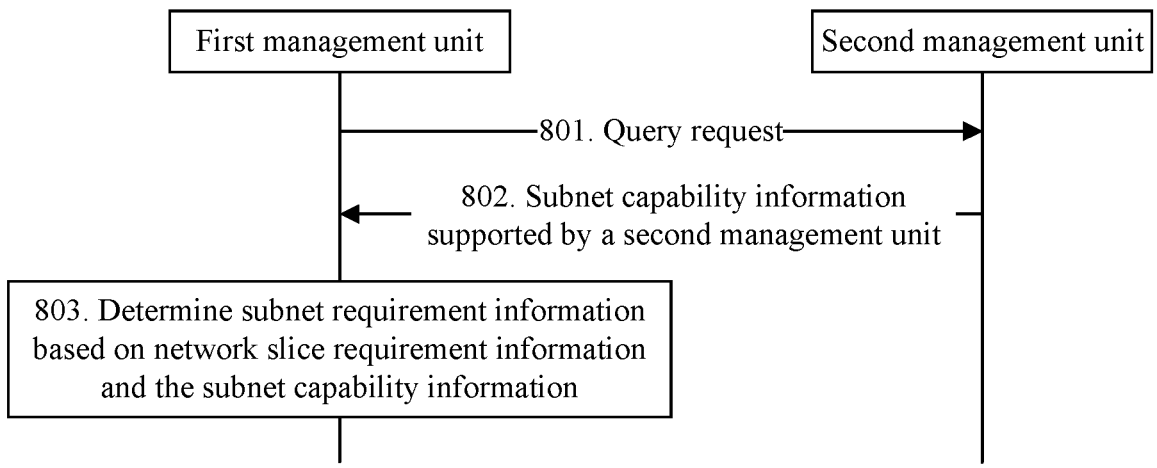
FIG. 8A is a schematic communication diagram of a further NSL management method according to an embodiment of the present disclosure.
Figure 8B:
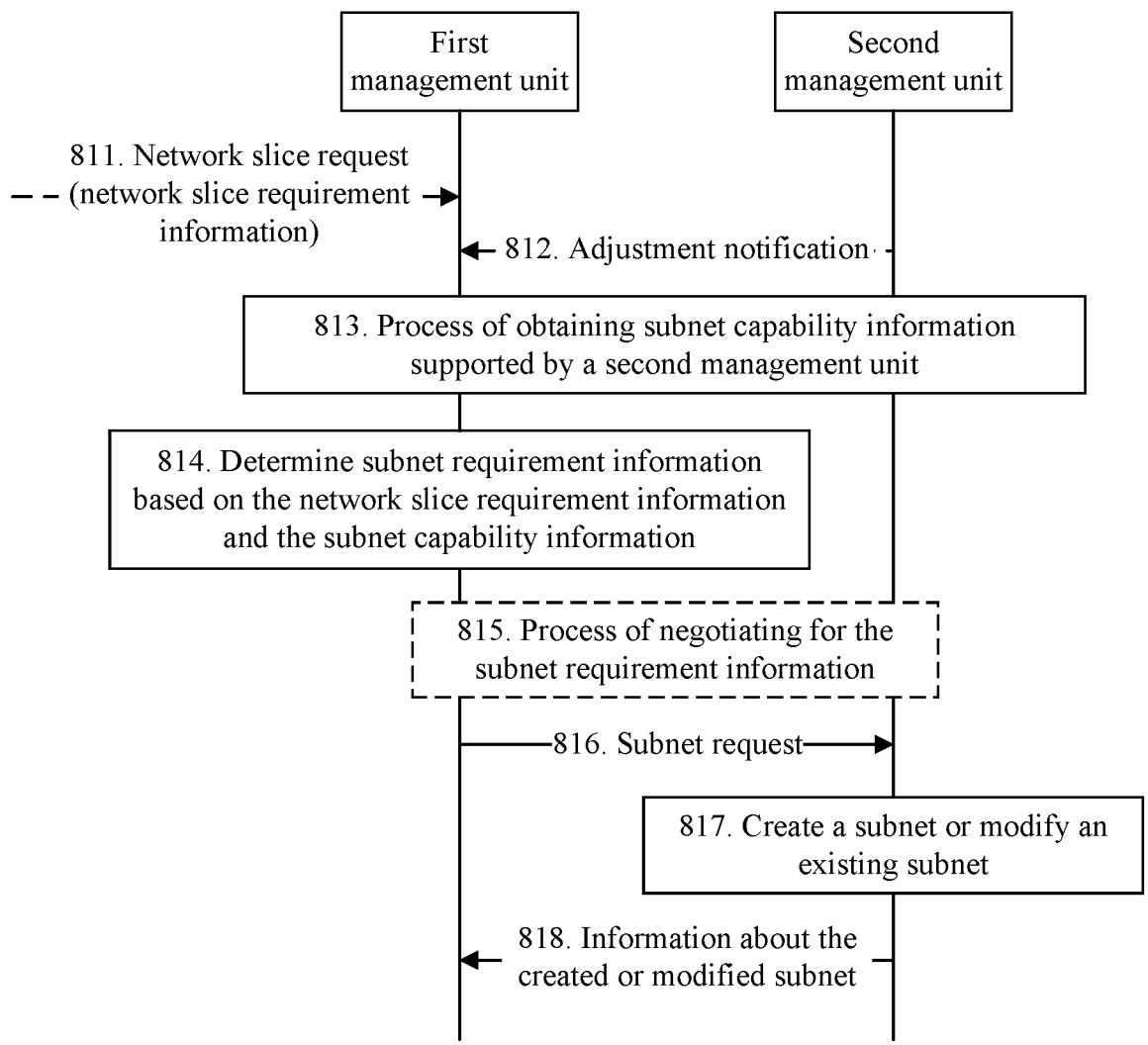
FIG. 8B is a schematic communication diagram of a still further NSL management method according to an embodiment of the present disclosure.

The following further describes a solution according to an embodiment of the present disclosure with reference to FIG. 8B. A method shown in FIG. 8B includes part 811 to part 818. Part 811, part 812, and part 815 are optional parts. It should be noted that part 811 and part 812 are two parallel optional parts, and either is selected and performed.

Part 811 is the same as or similar to part 401 in FIG. 4. For details, refer to the descriptions of part 401. Details are not described herein again.

Part 812 and part 813 are the same as or similar to part 602 and part 603 in FIG. 6. For details, refer to the descriptions of part 602 and part 603. Details are not described herein again.

In part 814, a first management unit determines subnet requirement information based on NSL requirement information and subnet capability information supported by a second management unit.

If part 811 is performed, part 814 is the same as or similar to part 505 in FIG. 5. For details, refer to the descriptions of part 505. If part 812 is performed, part 814 is the same as or similar to part 604 in FIG. 6. For details, refer to the descriptions of part 604. Details are not described herein again.

Part 815 to part 818 are the same as or similar to part 605 to part 608 in FIG. 6. For details, refer to the descriptions of part 605 to part 608. Details are not described herein again.

It should be noted that before performing part 814, the first management unit already obtains the subnet capability information supported by the second management unit. Therefore, after part 814 is performed, part 815 may be skipped, and the determined subnet requirement information is directly sent to the second management unit in part 816. This facilitates quick NSL deployment. Alternatively, after performing part 814, the first management unit may perform part 815, and send, to the second management unit in part 816, the subnet requirement information on which the first management unit and the second management unit agree after negotiation.

In the foregoing solution shown in FIG. 8A or FIG. 8B, the first management unit may be a CDM unit, the second management unit may be a CN-DM unit, an access network domain manager unit, or a TN-DM unit, and a third management unit may be a BS S/customer.

The foregoing mainly describes, from a perspective of interaction between different management units, the solutions provided in the embodiments of the present disclosure. It may be understood that, to implement the foregoing functions, the first management unit and the second management unit include corresponding hardware structures and/or software modules for performing the functions. With reference to the units and algorithm steps in the examples described in the embodiments disclosed in the present disclosure, the embodiments of the present disclosure can be implemented in a form of hardware or in a form of a combination of hardware and computer software. Whether a function is performed by hardware or by hardware driven by computer software depends on particular applications and design constraints of the technical solutions. For each particular application, a person skilled in the art may use a different method to implement the described functions, but it should not be considered that the implementation goes beyond the scope of the technical solutions in the embodiments of the present disclosure.

In the embodiments of the present disclosure, functional module division may be performed on the first management unit, the second management unit, and the like based on the foregoing method examples. For example, functional modules may be designed in correspondence to functions, or at least two functions may be integrated into one processing module. The integrated module may be implemented in a form of hardware, or may be implemented in a form of a software functional module. It should be noted that, in the embodiments of the present disclosure, the module division is an example and is merely logical function division. During actual implementation, there may be other division manners.

Figure 9A:
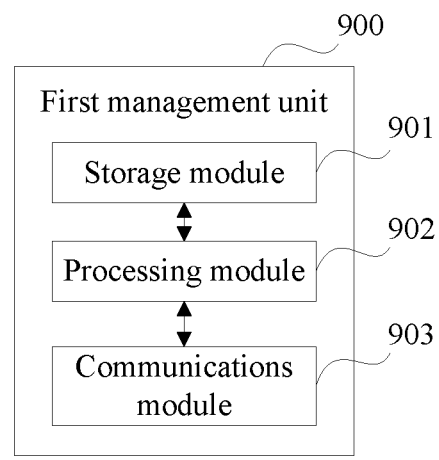
FIG. 9A is a schematic block diagram of a first management unit according to an embodiment of the present disclosure.

When the integrated module is used, FIG. 9A is a possible schematic block diagram of a first management unit according to an embodiment of the present disclosure. The first management unit 900 includes a processing module 902 and a communications module 903. The processing module 902 is configured to control and manage an action of the first management unit. For example, the processing module 902 is configured to support the first management unit in performing the parts 301 and 302 in FIG. 3, the parts 401 to 403, 406, 407, and 410 in FIG. 4, the parts 501, 502, and 505 to 507 in FIG. 5, the parts 603 to 606 in FIG. 6, the parts 701 to 708 in FIG. 7, the parts 801 and 803 in FIG. 8A, and the parts 811 and 813 to 816 in FIG. 8B, and/or other parts used in the technologies described in this specification. The communications module 903 is configured to support communication between the first management unit and a second management unit or a third management unit. The first management unit may further include a storage module 901, configured to store program code and data of the first management unit.

The processing module 902 may be a processor or a controller, such as a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processing module 902 may implement or perform various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications module 903 may be a communications interface, a transceiver, a transceiver circuit, or the like. The communications interface is a collective term. In a specific implementation, the communications interface may include a plurality of interfaces, for example, an interface between the first management unit and the second management unit or the third management unit, and/or another interface. The storage module 901 may be a memory.

Figure 9B:
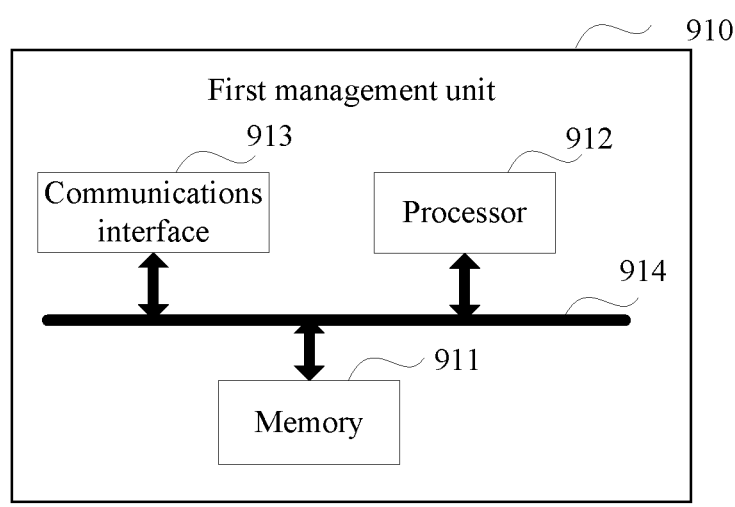
FIG. 9B is a schematic structural diagram of a first management unit according to an embodiment of the present disclosure.

When the processing module 902 is a processor, the communications module 903 is a communications interface, and the storage module 901 is a memory, the first management unit provided in this embodiment of the present disclosure may be a first management unit shown in FIG. 9B.

Referring to FIG. 9B, the first management unit 910 includes a processor 912, a communications interface 913, and a memory 911. Optionally, the first management unit 910 may further include a bus 914. The communications interface 913, the processor 912, and the memory 911 may be connected to each other by using the bus 914. The bus 914 may be a peripheral component interconnect (PCI) bus, an extended industry standard architecture (EISA) bus, or the like. The bus 914 may be classified into an address bus, a data bus, a control bus, or the like. For ease of representation, the bus is represented in FIG. 9B by using only one bold line, but this does not mean that there is only one bus or only one type of bus.

The first management unit shown in FIG. 9A or FIG. 9B may be the CDM unit in FIG. 2.

Figure 10A:
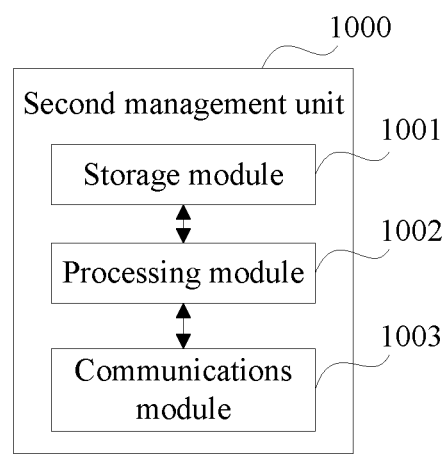
FIG. 10A is a schematic block diagram of a second management unit according to an embodiment of the present disclosure.

When the integrated module is used, FIG. 10A is a possible schematic block diagram of a second management unit according to an embodiment of the present disclosure. The second management unit 1000 includes a processing module 1002 and a communications module 1003. The processing module 1002 is configured to control and manage an action of the second management unit. For example, the processing module 1002 is configured to support the second management unit in performing the part 303 in FIG. 3, the parts 404, 405, 408, 409, 411, and 412 in FIG. 4, the parts 503, 504, 506, 508, and 509 in FIG. 5, the parts 601 to 603, 605, 607, and 608 in FIG. 6, the parts 703 to 708 in FIG. 7, the process 802 in FIG. 8A, the parts 813, 815, 817, and 818 in FIG. 8B, and/or other parts used in the technologies described in this specification. The communications module 1003 is configured to support communication between the second management unit and a first management unit. The second management unit may further include a storage module 1001, configured to store program code and data of the second management unit.

The processing module 1002 may be a processor or a controller, for example, a CPU, a general purpose processor, a DSP, an ASIC, an FPGA or another programmable logic device, a transistor logic device, a hardware component, or any combination thereof. The processing module 1002 may implement or perform various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor. The communications module 1003 may be a communications interface, a transceiver, a transceiver circuit, or the like. The communications interface is a collective term. In a specific implementation, the communications interface may include a plurality of interfaces, for example, an interface between the second management unit and the first management unit, and/or another interface. The storage module 1001 may be a memory.

Figure 10B:
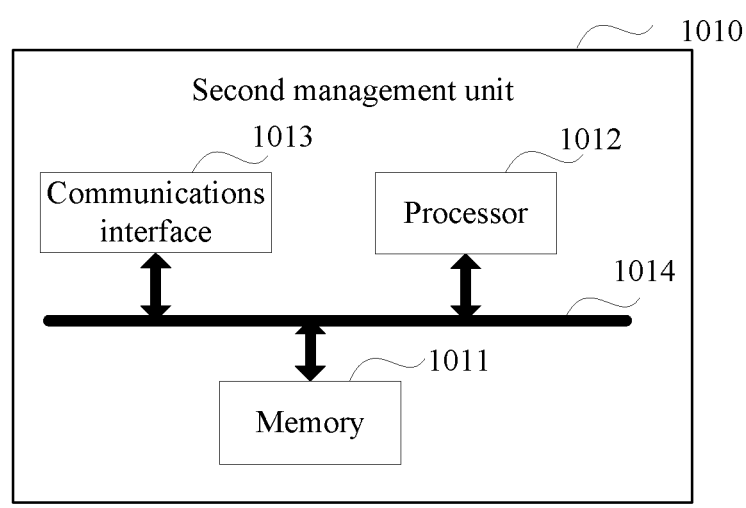
FIG. 10B is a schematic structural diagram of a second management unit according to an embodiment of the present disclosure.

When the processing module 1002 is a processor, the communications module 1003 is a communications interface, and the storage module 1001 is a memory, the second management unit provided in this embodiment of the present disclosure may be a second management unit shown in FIG. 10B.

Referring to FIG. 10B, the second management unit 1010 includes a processor 1012, a communications interface 1013, and a memory 1011. Optionally, the second management unit 1010 may further include a bus 1014. The communications interface 1013, the processor 1012, and the memory 1011 may be connected to each other by using the bus 1014. The bus 1014 may be a PCI bus, an EISA bus, or the like. The bus 1014 may be classified into an address bus, a data bus, a control bus, or the like. For ease of representation, the bus is represented in FIG. 10B by using only one bold line, but this does not mean that there is only one bus or only one type of bus.

The second management unit shown in FIG. 10A or FIG. 10B may be the CN-DM unit, the access network domain manager unit, or the TN-DM unit in FIG. 2.

Steps of the methods or algorithms described with reference to the content disclosed in the embodiments of the present disclosure may be implemented by using hardware, or may be implemented by a processor by executing a software instruction. The software instruction may include a corresponding software module. The software module may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the first management unit or the second management unit. Certainly, the processor and the storage medium may exist in the first management unit or the second management unit as a discrete component.

A person skilled in the art should be aware that in the foregoing one or more examples, all or some of the functions described in the embodiments of the present disclosure may be implemented by using software, hardware, firmware, or any combination thereof. When the software is used to implement the functions, all or some of the functions may be implemented in a form of a computer program product. The computer program product includes one or more computer instructions. When the computer instructions are loaded and executed on a computer, all or some of the procedures or functions described in the embodiments of the present disclosure are generated. The computer may be a general-purpose computer, a special-purpose computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

In the foregoing specific implementations, the objectives, technical solutions, and beneficial effects of the embodiments of the present disclosure are further described in detail. It should be understood that the foregoing descriptions are merely specific implementations of the embodiments of the present disclosure, but are not intended to limit the protection scope of the embodiments of present disclosure. Any modification, equivalent replacement, or improvement made based on the technical solutions of the embodiments of the present disclosure shall fall within the protection scope of the embodiments of the present disclosure.

What is claimed is:

1. A network slice management method, comprising:
    determining, by a first management device, subnet requirement information based on network slice requirement information, wherein a network slice comprises at least one subnet;
    sending, by the first management device to a second management device, a first negotiation request for querying for a support status of the second management device for the subnet requirement information, wherein the first negotiation request comprises the subnet requirement information;
    receiving, by the first management device from the second management device, a negotiation response comprising indication information, wherein the indication information indicates whether the second management device supports the subnet requirement information; and sending, by the first management device, one of the following (a) and (b) to the second management device,
(a) a subnet request for creation of the subnet, or for modification of an existing subnet, if the indication information indicates that the second management device supports the subnet requirement information, wherein the subnet request comprises the subnet requirement information; and
(b) a second negotiation request for querying for a support status of the second management device for updated subnet requirement information if the support status indicates that the second management device does not support the subnet requirement information, wherein the second negotiation request comprises the updated subnet requirement information, wherein before the determining, by the first management device, the subnet requirement information based on the network slice requirement information, the method further comprises:
receiving, by the first management device from the second management device, a notification, wherein the notification instructs the first management device to determine the subnet requirement information.

2. The method according to claim 1, wherein before the determining, by the first management device, the subnet requirement information based on network slice requirement information, the method further comprises:
receiving, by the first management device from the second management device, subnet capability information supported by the second management device; and
determining, by the first management device, the subnet requirement information based on the network slice requirement information and the subnet capability information.

3. The method according to claim 2, wherein before the receiving, by the first management device from the second management device, the subnet capability information supported by the second management device, the method further comprises:
sending, by the first management device to the second management device, a query request for requesting the subnet capability information.

4. The method according to claim 1, wherein before the determining, by the first management device, the subnet requirement information based on network slice requirement information, the method further comprises:
receiving, by the first management device from a third management device, a network slice request, wherein the network slice request carries the network slice requirement information, and the network slice request requests creation or modification of the network slice.

5. A network slice management method, comprising:
receiving, by a second management device from a first management device, a first negotiation request comprising subnet requirement information, wherein the first negotiation request queries for a support status of the second management device for the subnet requirement information, and a network slice comprises at least one subnet;
determining, by the second management device, whether the second management device supports the subnet requirement information;

sending, by the second management device to the first management device, a negotiation response comprising indication information, wherein the indication information indicates whether the second management device supports the subnet requirement information; and
receiving, by the second management device, one of the following (a) and (b) from the first management device,
(a) a subnet request for creation of the subnet, or for modification of an existing subnet, if the second management device supports the subnet requirement information, wherein the subnet request comprises the subnet requirement information; and
(b) a second negotiation request for querying for a support status of the second management device for updated subnet requirement information if the second management device does not support the subnet requirement information, wherein the second negotiation request comprises the updated subnet requirement information, wherein before the receiving, by the second management device, the first negotiation request from the first management device, the method further comprises:
sending, by the second management device, a notification to the first management device, wherein the notification instructs the first management device to determine the subnet requirement information.

6. The method according to claim 5, wherein before the sending, by the second management device, the notification to the first management device, the method comprises:
collecting, by the second management device, subnet network performance; and
sending, by the second management device, the notification to the first management device when the subnet network performance does not meet the subnet requirement information supported by the second management device.

7. The method according to claim 5, wherein before the receiving, by the second management device, the first negotiation request from the first management device, the method further comprises:
sending, by the second management device, subnet capability information supported by the second management device to the first management device.

8. The method according to claim 7, wherein before the sending, by the second management device, the subnet capability information supported by the second management device to the first management device, the method further comprises:
receiving, by the second management device, a query request from the first management device, wherein the query request is used to request the subnet capability information.

9. A first management device, comprising:
a processor; and
a memory coupled to the processor and having program instructions stored thereon which, when executed by the processor, cause the first management device to perform operations comprising:
receiving a notification from a second management device, wherein the notification instructs the first management device to determine subnet requirement information;
determining the subnet requirement information based on network slice requirement information, wherein a network slice comprises at least one subnet;
sending, to the second management device, a first negotiation request for querying for a support status of the second management device for the subnet requirement information, wherein the first negotiation request comprises the subnet requirement information;

receiving, from the second management device, a negotiation response comprising indication information, wherein the indication information indicates whether the second management device supports the subnet requirement information; and sending, to the second management device, one of the following (a) and (b):
  (a) a subnet request for creation of the subnet, or for modification of an existing subnet, if the indication information indicates that the second management device supports the subnet requirement information, wherein the subnet request comprises the subnet requirement information; and
  (b) a second negotiation request for querying for a support status of the second management device for updated subnet requirement information if the support status indicates that the second management device does not support the subnet requirement information, wherein the second negotiation request comprises the updated subnet requirement information.

10. The first management device according to claim 9, wherein when executed by the processor, the program instructions further cause the first management device to perform operations comprising:
  receiving subnet capability information supported by the second management device from the second management device; and determining the subnet requirement information based on the network slice requirement information and the subnet capability information.

11. The first management device according to claim 10, wherein when executed by the processor, the program instructions further cause the first management device to perform operations comprising:
  sending a query request for requesting the subnet capability information to the second management device.

12. The first management device according to claim 9, wherein when executed by the processor, the program instructions further cause the first management device to perform operations comprising:
  receiving a network slice request from a third management device, wherein the network slice request requests creation or modification of the network slice; wherein the network slice request comprises the network slice requirement information.

* * * * *